United States Patent [19]
Santos et al.

[11] Patent Number: 5,933,306
[45] Date of Patent: Aug. 3, 1999

[54] CIRCUIT BREAKER WITH GROUND FAULT DETECTION MODULE

[75] Inventors: Esteban Santos, Farmington; Edward E. Kim, Burlington; Joseph Criniti, New Britain; Javier I. Larranaga, Bristol, all of Conn.

[73] Assignee: General Electric Company, Schenectady, N.Y.

[21] Appl. No.: 09/006,795

[22] Filed: Jan. 14, 1998

[51] Int. Cl.$^6$ ...................................... H02H 3/16
[52] U.S. Cl. .............................. 361/45; 361/102; 361/115
[58] Field of Search .................. 361/42–50, 93–102, 361/115; 335/18, 215

[56] References Cited

U.S. PATENT DOCUMENTS

| | | | |
|---|---|---|---|
| 3,621,334 | 11/1971 | Burns et al. | 361/45 |
| 4,513,268 | 4/1985 | Seymour et al. | 335/35 |
| 4,667,263 | 5/1987 | Morris et al. | 361/42 |
| 5,023,684 | 6/1991 | Tsunoda | 257/423 |
| 5,627,704 | 5/1997 | Lederman et al. | 360/113 |

*Primary Examiner*—Jeffrey Gaffin
*Assistant Examiner*—Michael J. Sherry
*Attorney, Agent, or Firm*—Dave S. Christensen; Carl B. Horton

[57] ABSTRACT

A ground fault protection module is attached to a circuit breaker employing a thermal-magnetic trip unit to separate the circuit breaker contacts upon occurrence of a ground fault. The ground fault module contains a logic circuit and a giant magnetic resistor for detecting the ground fault.

14 Claims, 3 Drawing Sheets

CIRCUIT BREAKER WITH GROUND FAULT DETECTION MODULE

BACKGROUND OF THE INVENTION

Circuit breakers currently used to protect residential environments are described in U.S. Pat. No. 4,513,268 entitled "Automated Q-Line Circuit Breaker". In the aforementioned patent, trip units in the form of combined thermal and electromagnetic sensors are used to determine the presence of overcurrent conditions and to release an operating mechanism to separate the circuit breaker contacts.

To provide ground fault protection facility to such residential circuit breakers, a ground fault module such as described in U.S. Pat. No. 4,667,263 entitled "Ground Fault Module for Ground Fault Circuit Breaker" is attached to the circuit breaker and interacts with the circuit breaker operating mechanism to interrupt circuit current upon occurrence of a ground fault.

As described in the aforementioned US patents, current transformers are required to sense the circuit current in one of two ways. In one approach a first current transformer senses the circuit line current and a second transformer senses the circuit neutral current and a comparison circuit is used to determine whether there is a remainder current as indicative of ground fault. Another approach uses a summing transformer to surround both the line and neutral conductors and determines the presence of a ground fault when the resultant current is above a predetermined value.

The size of the current transformers are governed by the corresponding size of the magnetic cores to insure that the cores do not become saturated upon occurrence of a large overcurrent. The size of the current transformers are further increased in proportion to the ampere rating of the protected circuit. U.S. patent application Ser. No. 08/726,896 filed Oct. 4, 1996 entitled "Circuit Breaker with Arcing Fault Detection Module" describes the use of a current transformer of reduced size for sensing arcing faults in residential applications.

In certain so-called "industrial-rated" circuit breakers, the current transformers are enclosed within the same enclosure that houses the circuit breaker operating mechanism such the available space for containing the transformers is somewhat limited.

In view of the economic advantage with circuit breakers employing thermal-magnetic trip units for residential applications, it would be desirable to incorporate ground fault protection within such circuit breakers without incurring the costs associated with requisite current transformers for sensing circuit current.

One purpose of the invention is to describe a ground fault detection module that can be attached to a thermal-magnetic circuit breaker for sensing ground faults and interrupting the protected circuit immediately upon detection thereof.

A further purpose of the invention is to allow efficient current sensing within the ground fault module without requiring the use of current transformers, per se.

SUMMARY OF THE INVENTION

A ground fault protection module is attached to a circuit breaker employing a thermal-magnetic trip unit to separate the circuit breaker contacts upon occurrence of a ground fault. The ground fault module contains a logic circuit and a pair of giant magnetic resistors, (GMR's) for detecting the ground fault and activating a trip solenoid to articulate the circuit breaker to interrupt the protected circuit.

DESCRIPTION OF THE PREFERRED EMBODIMENT

Figure 1:
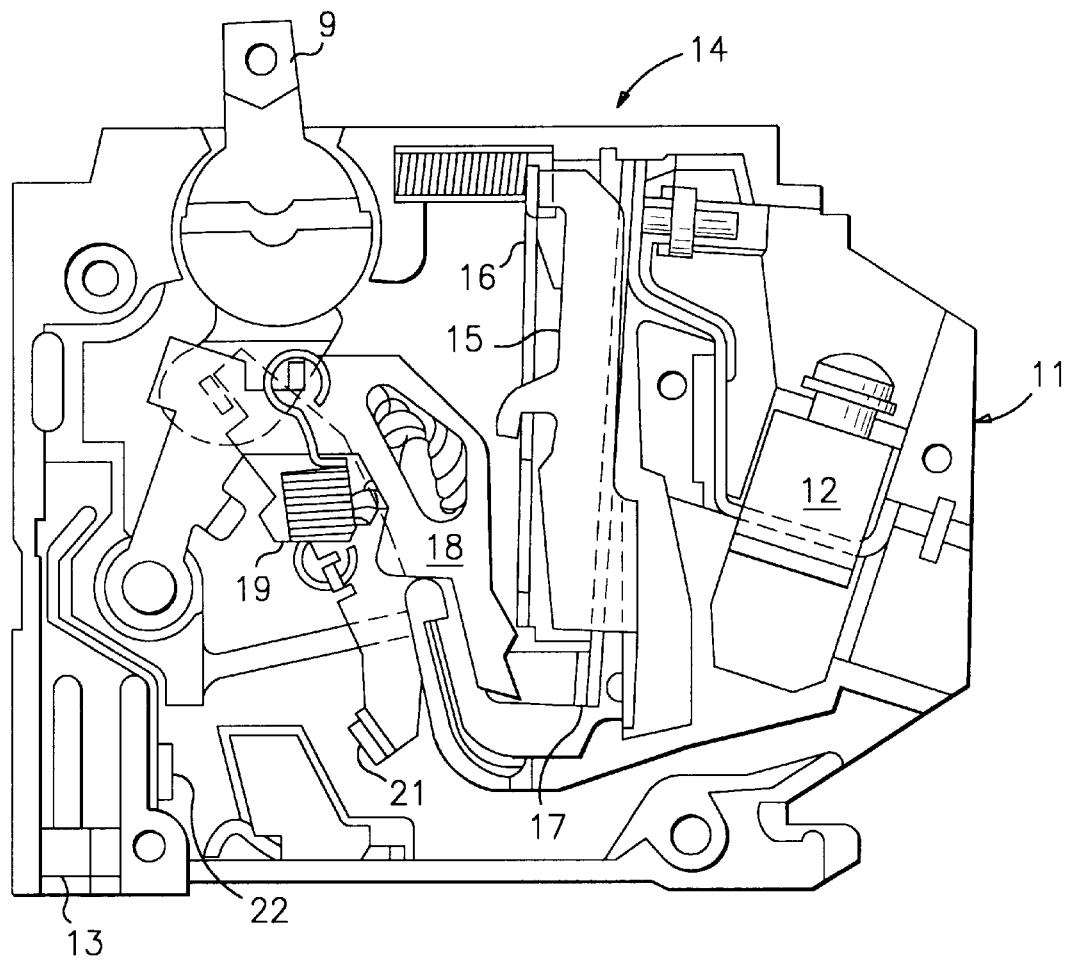
FIG. 1 is a front plan view of a circuit breaker containing a thermal-magnetic trip unit according to the prior art.

A state-of-the-art residential circuit breaker 10 having the externally-operated handle 9 is shown in FIG. 1 to consist of a molded plastic case 11 which houses the circuit breaker internal components. The circuit current transfers from the load terminal lug 12, thermal-magnetic trip unit 14, fixed and moveable contacts 22, 21 to the line terminal stab 13. The thermal-magnetic trip unit includes a magnet 15 and an armature 16 that are arranged for operation upon occurrence of so-called "short circuit" and "short time" fault conditions within the protected circuit. "Long time" overcurrent protection is provided by means of the bimetal 17 as described within the aforementioned U.S. Pat. No. 4,513,268. The operating cradle 18 interacts with armature 16 to hold the contacts from being separated by the bias provided by the operating spring 19.

Figure 2:
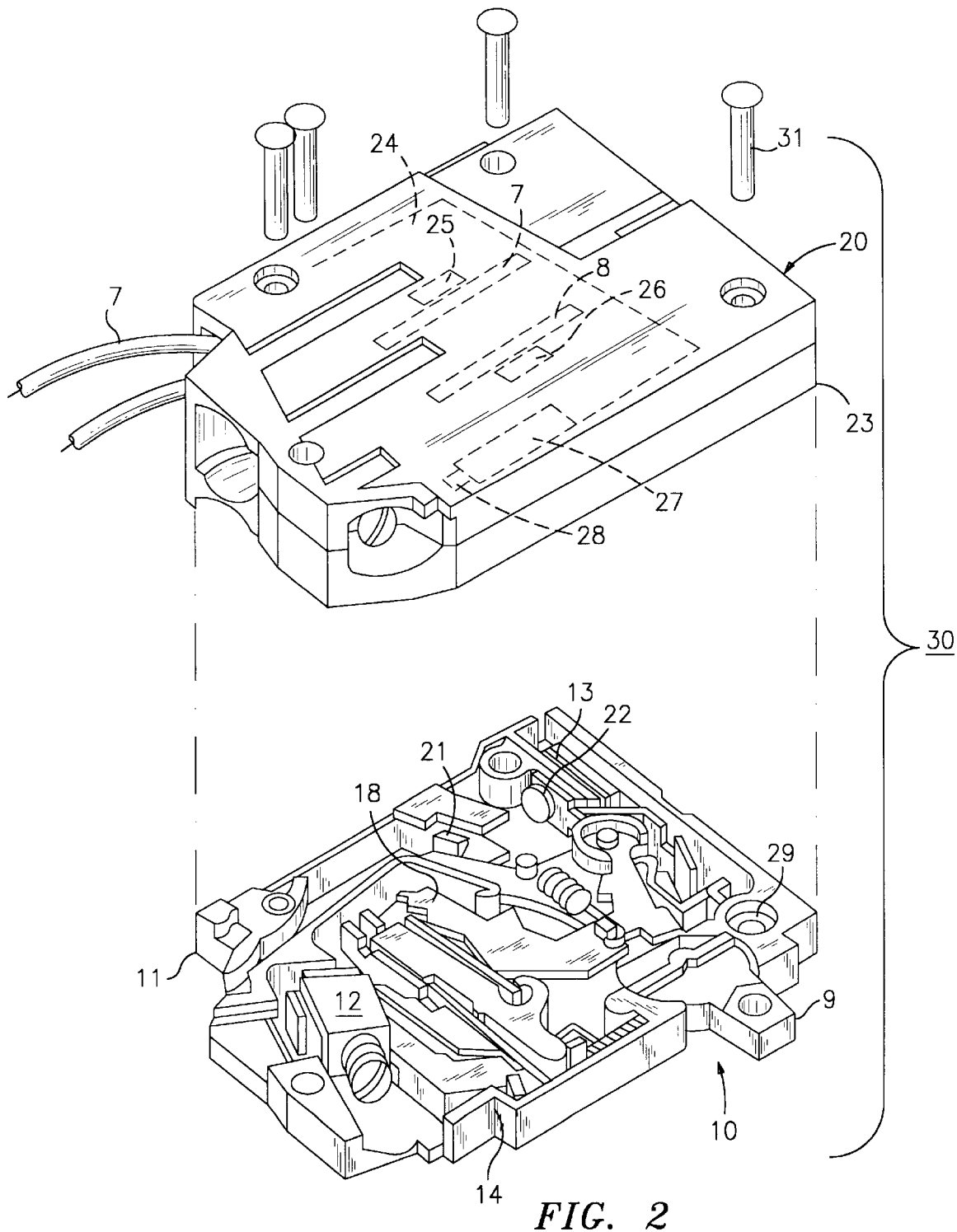
FIG. 2 is a top perspective view of the circuit breaker of FIG. 1 with the ground fault module of the invention in isometric projection.

In accordance with the invention, a combined ground fault and circuit breaker unit 30 is depicted in FIG. 2 and is formed by attaching the case 23 of a ground fault module 20 to the case 11 of the circuit breaker 10 by means of rivets 31 and apertures 29, as indicated. The ground fault module is similar to the ground fault module described in the aforementioned U.S. Pat. No. 4,667,263 with GMR 25 and GMR 26 substituted for the current transformers used for ground fault detection. The GM's are type NVE AAxxx obtained from Nonvolatile Electronics Inc. The sensitivity of GMRs for current detection is described in the article entitled "Attractions of Giant Magnetoresistance Sensors" appearing in *Electrotechnology,* October–November, 1996. A good description of the structure of the GMRs is found in U.S. Pat. No. 5,627,704 entitled "Thin-Film Giant Magnetoresistive CPP Transducer with Flux Guide Yoke Structure". The current carrying wire conductor 7 is adjacent the first GMR 25 so that the GMR is in magnetic relation with the neutral conductor. The input current on the load lug 12 (FIG. 1) is applied to the neutral conductor 8 which is adjacent the second GMR 26 so that the GMR is in magnetic relation with the current carrying conductor. The term "magnetic relation" is defined herein to mean the positional relation whereby the GMR is subject to the magnetic field generated by current transfer within the associated current-carrying conductor. The printed wire board 24 containing the ground fault sensing circuit 32 (FIG. 3) is substituted for the ground fault sensing components in the aforementioned U.S. Pat. No. 4,667,263. The trip solenoid 27 operates in a similar manner to the ground fault trip solenoid described therein and projects a trip armature 28 into contact with the circuit breaker operating cradle and could alternately be mounted within the circuit breaker enclosure, if desired, to separate the fixed and movable contacts 22,21 independent of the circuit breaker trip unit 14 as shown in FIG. 1. Electrical connection with the associated electric circuit is made by means of the line terminal stab 13 and the ON-OFF state of 9. The ON and OFF condition of the contacts 21, 22 is controlled by the operating handle 9.

Figure 3:
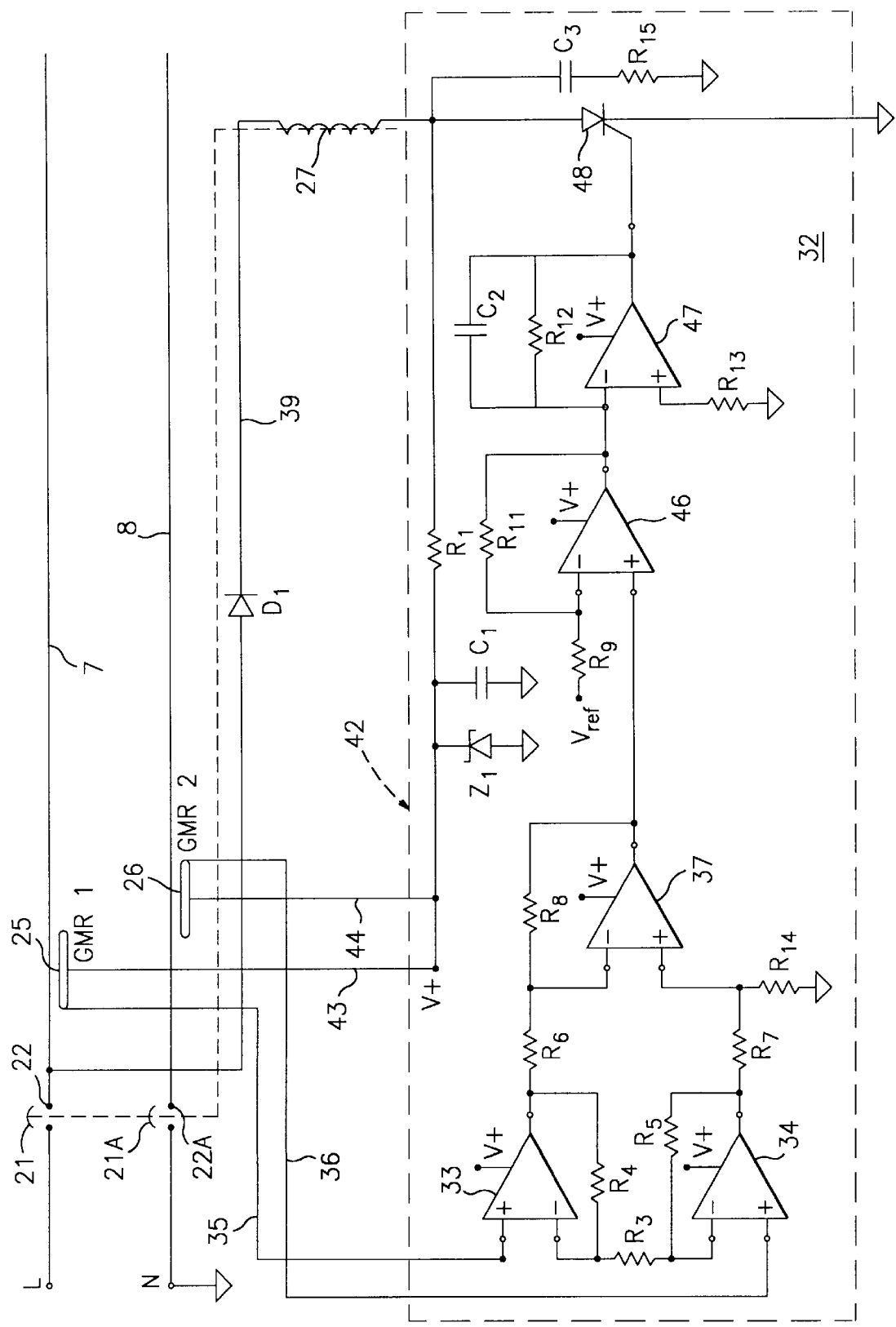
FIG. 3 is a diagrammatic representation of the ground fault detection circuit within the ground fault module of FIG. 2.

The components within the ground fault sensing circuit 32 shown as FIG. 3 that is contained within the printed wire board 24 are best seen by now referring both to FIGS. 2 and 3. The fixed and movable contacts 22, 21 are connected within the line conductor 7 and the first GMR 25 is positioned in close proximity therewith. The second GMR 26 is positioned in close proximity with the neutral conductor 8 and a second pair of fixed and movable contacts 21A, 22A can be connected within the neutral conductor, if desired although it is understood that circuit interruption can be accomplished by means of contacts 21, 22, per se. Operating power to the GMRs is provided by means of the power supply 42 consisting of resistor R1, capacitor C1 and Zener diode Z1 over conductors 44 and 45. Input power to the power supply is provided by connection between conductor 39 and the line conductor 7 through the rectifying diode D1. The output signals from GMRs 25, 26 representative of line and neutral currents is inputted to the GMR logic circuit 32 over conductors 35, 36 connecting with inputs to a pair of operational amplifiers 33, 34 that are interconnected with resistors R3–R5. The outputs of the operational amplifiers are connected with the inputs to a differential amplifier 37 via resistors R6–R8 and to ground via resistor R14. The output from the differential amplifier is compared with a reference voltage through resistors R9, R11 within a first comparator 46 and then comparator 47 for filtering extraneous noise signals through filter capacitor C2, filter resistor R12 and ground resistor R13 for verification of the ground current signal. Separate filter capacitor C3 and filter resistor R15 are used to filter noise signals that may occur time to time within the ground fault logic circuit. In the absence of a ground fault condition, the current within the neutral and line conductors is equal and opposite in sign so that within prescribed limits, upon subtraction, the resultant current is zero. The presence of a current above a predetermined threshold provides indication of a ground fault condition caused by current flowing to ground somewhere along the protected circuit. Upon the occurrence of a signal on the output of the comparator 47 and the gate of the SCR 48, sufficient to turn on the SCR, current flows through the solenoid 27 causing trip armature 28 (shown in FIG. 2) to strike the operating cradle 18 (shown in FIG. 1) and release the contacts 21, 22, 21 A, 22A as described earlier.

A ground fault module has herein been described capable of detecting the occurrence of a ground fault condition and utilizing the interruption facility of a standard thermal magnetic circuit breaker to interrupt a protected circuit. The module employs a pair of GMR's and a custom logic circuit to verify the ground fault occurrence.

We claim:

1. A ground fault module comprising:

an enclosure;

means for separating a pair of circuit breaker contacts connected within an external electric circuit;

an electric conductor within said enclosure, said conductor being arranged for connection with an external electric circuit;

a GMR within said enclosure in magnetic relation with said conductor whereby said GMR produces an output signal in proportion to current flow within said conductor;

a logic circuit within said enclosure, said logic circuit connected with said GMR and with said means for separating a pair of circuit breaker contacts upon determination of a ground fault within said external electric circuit; and a second GMR within said enclosure and a second electric conductor within said enclosure, said second conductor being arranged for connection with said external electric circuit.

2. The ground fault of claim 1 wherein said logic circuit comprises a pair of first and second operational amplifiers having inputs connecting with said GMR and said second GMR, said first operational amplifier producing a first output signal and second operational amplifier producing a second output signal upon occurrence of a ground fault condition within said external electric circuit.

3. The ground fault module of claim 2 including a differential amplifier having inputs connecting with said first and second operational amplifiers, for producing a third output signal upon occurrence of a ground fault condition within said external electric circuit.

4. The ground fault module of claim 3 including a first comparator connecting with said differential amplifier and a reference voltage for producing a fourth output signal upon occurrence of the ground fault condition within said external electric circuit.

5. The ground fault module of claim 4 including a second comparator connecting with said first comparator and with a resistor, for producing a fifth output signal upon occurrence of a ground fault condition within said external electric circuit.

6. The ground fault module of claim 5 including an SCR connecting with the second comparator and said means for separating a pair of circuit breaker contacts whereby said SCR provides an operating signal for activating said separating means to separate the pair of circuit breaker contacts upon occurrence of a ground fault condition within said external electric circuit.

7. The ground fault module of claim 1 wherein said means for separating a pair of circuit breaker contacts comprises a solenoid.

8. A circuit breaker having means for both overcurrent interruption and ground fault interruption comprising:

a molded plastic case;

a pair of contacts within said case arranged for connection with a protected electric circuit;

an operating mechanism within said case for separating contacts upon occurrence of an overcurrent condition within said protected circuit;

a thermal-magnetic trip unit within said case proximate said operating mechanism, said thermal-magnetic trip unit interacting with said operating mechanism for causing said operating mechanism to separate said contacts;

a ground fault module attached to said case, said ground fault module including an electric conductor being arranged for connection with an external electric circuit;

a GMR in magnetic relation with said conductor whereby said GMR produces an output current in proportion to current flow within said conductor;

a logic circuit, said logic circuit connected with said GMR and with means for separating the pair of circuit breaker contacts upon determination of a ground fault within said external electric circuit; and, a second GMR and a second electric conductor, said second conductor being arranged for connection with said external electric circuit.

9. The circuit breaker of claim 8 wherein said logic circuit comprises a pair of first and second operational amplifiers having inputs connecting with said GMR and said second GMR, said first operational amplifier producing a first output signal and said second operational amplifier producing a second output signal upon occurrence of a ground fault condition within said external electric circuit.

10. The circuit breaker of claim 9 including a differential amplifier having inputs connecting with said first and second operational amplifiers, for producing a third output signal upon occurrence of a ground fault condition within said external electric circuit.

11. The circuit breaker of claim 10 including a first comparator connecting with said differential amplifier and a reference voltage for producing a fourth output signal upon occurrence of a ground fault condition within said external electric circuit.

12. The circuit breaker of claim 11 including a second comparator connecting with the first comparator and with a resistor, for producing a fifth output signal upon occurrence of a ground fault condition within said external electric circuit.

13. The circuit breaker of claim 12 including an SCR connecting with the second comparator and said means for separating a pair of circuit breaker contacts whereby said SCR provides an operating signal for activating said separating means to separate the pair of circuit breaker contacts upon occurrence of a ground fault condition within said external electric circuit.

14. The circuit breaker of claim 8 wherein said means for separating the pair of circuit breaker contacts comprises a solenoid.

* * * * *